United States Patent
Kimball et al.

(10) Patent No.: US 6,250,326 B1
(45) Date of Patent: Jun. 26, 2001

(54) DUAL TEMPERATURE FIRE DAMPER RELEASING SYSTEM

(75) Inventors: Randy Dean Kimball; Michael Robert Beaver, both of Keller; Patrick A. Cockrum, Southlake, all of TX (US)

(73) Assignee: PCI Industries, Fort Worth, TX (US)

( * ) Notice: Subject to any disclaimer, the term of this patent is extended or adjusted under 35 U.S.C. 154(b) by 0 days.

(21) Appl. No.: 09/498,195

(22) Filed: Feb. 4, 2000

(51) Int. Cl.[7] .......................... F16K 17/40; F24F 11/053; A62C 2/24
(52) U.S. Cl. .................. 137/75; 137/74; 137/79; 126/287.5; 16/48.5; 251/279; 454/369
(58) Field of Search ................. 16/48.5; 126/287.5; 137/72, 74, 75, 79; 251/233, 237, 243, 279; 454/257, 369

(56) References Cited

U.S. PATENT DOCUMENTS

| | | | |
|---|---|---|---|
| 4,287,638 | * | 9/1981 | McCabe ............................ 16/48.5 |
| 4,463,896 | | 8/1984 | Schaus .............................. 236/49 |
| 4,472,999 | * | 9/1984 | McCabe ............................ 137/75 |
| 4,911,065 | * | 3/1990 | Van Becelaere ................. 454/369 |
| 5,577,525 | * | 11/1996 | Wirfel et al. ..................... 137/77 |
| 5,728,001 | * | 3/1998 | Attridge, Jr. ..................... 137/79 |
| 5,779,540 | * | 7/1998 | Nailor .............................. 137/79 |

OTHER PUBLICATIONS

Imperial Damper & Louver Co., Inc. Override Resettable Dual Link, Damper Closure Mechanism for Model#s 770 & 771, Specifications Fire/Smoke Class II Override Model #770 & 771.

* cited by examiner

Primary Examiner—John Rivell
Assistant Examiner—Ramesh Krishnamurthy
(74) Attorney, Agent, or Firm—Koppel & Jacobs

(57) ABSTRACT

A mechanical dual temperature damper closing mechanism having a primary link that separates when the ambient temperature reaches approximately 74° F., closing the damper. The new mechanism provides a reliable means for reopening the damper to allow airflow for the control of smoke spread. A secondary link is engaged within the new mechanism to reopen the damper. When the ambient temperature reaches 180° F. the secondary link separates, closes the damper such that it cannot be reopened.

24 Claims, 8 Drawing Sheets

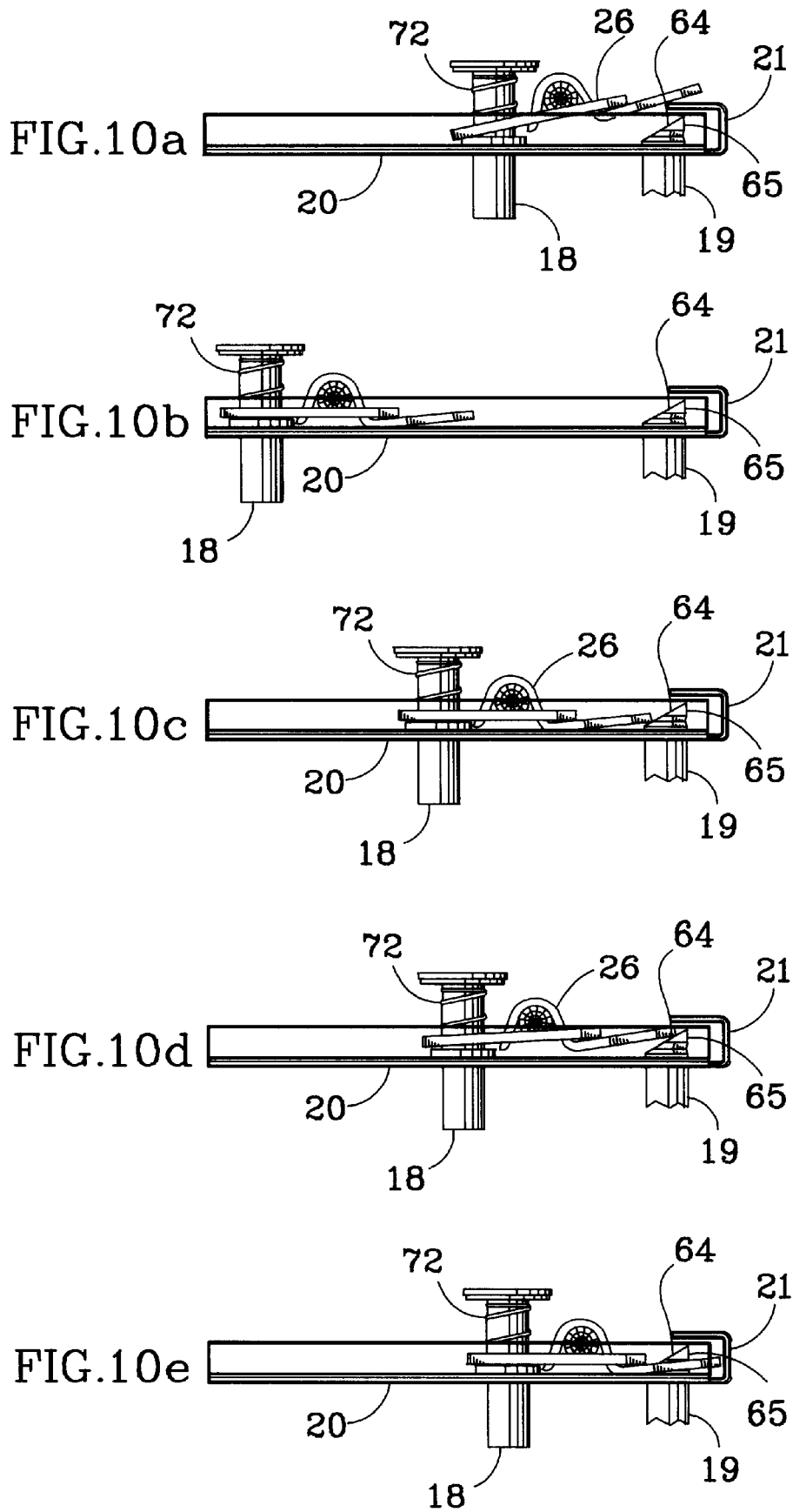

DUAL TEMPERATURE FIRE DAMPER RELEASING SYSTEM

BACKGROUND OF THE INVENTION

1. Field of the Invention

This invention relates to fire dampers and more particularly to a fire damper closing mechanism that closes a fire damper at two different temperatures.

2. Description of the Related Art

A major consideration in the design of commercial and residential buildings is the spread of fire and smoke in the event that a fire breaks out within the building. The walls and ceilings within the buildings serve as the primary barrier to the spread and are most effective if they have no breaks or holes. Most buildings have heating, ventilation, and air conditioning (HVAC) systems that distribute conditioned/ heated air throughout the building by air ducts. The ducts are directed to the various rooms and the air enters the rooms through a vent. However, the vents and ducts penetrate the walls/ceilings, providing a hole that reduces the ability to prevent the spread of fire and smoke. To address this problem, dampers are often provided in the ducts that allow air to pass when open, but block airflow, flames, and hot gasses when closed. At elevated temperatures (such as in the case of fire) the dampers automatically close, effectively closing the duct and vent holes and restoring the full integrity of the fire and/or smoke barrier.

In many fires, death and injury are caused by smoke, not fire. It was originally thought that closing the dampers would most effectively prevent the spread of both smoke and fire. However, the majority of smoke is spread by changes in pressure, with the smoke spreading from the area with increased pressure to an area with lower pressure. Fire increases air pressure and smoke commonly spreads to adjacent rooms and/or floors having a lower air pressure. Closing the dampers around a fire does not prevent the spread of smoke from fire pressure, and in some instances can cause an increase in fire pressure.

It was then discovered that the smoke spread could be retarded by providing air pressure opposing and surrounding the fire pressure. If the fire can be kept in a positive "pressure sandwich", smoke will spread much more slowly. One way to create this pressure sandwich is through the HVAC system, which can provide positive airflow to the fire zone. In the ducts surrounding the fire zone, the dampers in the supply air ducts are opened and the dampers in the return air ducts are closed.

However, most building code standards require dampers to automatically close at predetermined temperature, such as 74° Celsius (C) (165° Fahrenheit), to prevent the spread of fire. This prevents the dampers from being used to create a pressure sandwich at temperatures above the closing temperature. More recently, many building code standards allow dampers to be selectively reopened after they are initially closed so they can be used to control the spread of smoke. However, at a second higher temperature, such as 180° C. (350° Fahrenheit) the fire is considered out of control. The damper must again close and not be allowed to reopen.

Accordingly, there is a need for a damper that closes automatically at a predetermined lower temperature and can then be selectively reopened for smoke control. The damper must then close permanently at a predetermined higher temperature.

U.S. Pat. No. 4,463,896 to Schaus discloses a fire damper equipped with two thermally responsive electric switches. The first switch closes the damper at a predetermined temperature (74° C.). Control circuitry permits an override of the first switch, allowing the damper to be reopened. The second thermally responsive switch closes the damper again at a second higher predetermined temperature (180° C.). One disadvantage of this damper is that it is overly complex, relying on electrical circuitry and switches. This damper also relies on an electrical motor and circuitry that consume electricity. In larger buildings having many dampers, this energy consumption can add significant operating costs. Finally, this damper is a "power to open" product that requires electrical power to open. In some applications, it is desirable to have a power to close product where the damper stays closed with power and opens when power is lost.

Imperial Damper and Louver Company provides a dual link damper closure mechanism (Model Nos. 770 and 771), that closes a conventional damper at ambient temperatures greater than 74° C. The damper can be reopened by engaging a secondary link that enables the damper to function normally until the ambient temperature exceeds 180° C. At this temperature, the mechanism again closes the damper and it cannot be reopened. A primary disadvantage of this device is that it does not reliably engage the secondary heat responsive device and as a result, it will not reliably reopen the damper at temperatures exceeding 74° C.

SUMMARY OF THE INVENTION

The present invention provides a simple and reliable mechanical dual temperature damper closing mechanism. It automatically closes a damper at ambient temperatures exceeding a predetermined lower level, allows the damper to be reopened, and then automatically closes at ambient temperatures exceeding a second higher temperature. When it closes the second time, the damper cannot be reopened.

The new mechanism comprises a shaft that is mounted on a damper and connected to a motor that rotates the shaft around its longitudinal axis. The motor controls the opening and closing of the damper during normal operation. A driver arm and spring arm are perpendicularly mounted on the shaft adjacent to one another. The driver arm is fixed to the shaft such that rotation of the shaft will cause the driver arm to turn in an arc. The spring arm is not fixed to the shaft but can freely rotate about it. The spring arm is also attached to the damper blades such that rotation of the spring arm controls the opening and closing of the damper blades.

The two arms are connected by a primary link that separates at a predetermined temperature, such as 74° C. A spring arm pin passes through a hole in the spring arm and into a hole in the primary link. A driver arm pin passes through a hole in the driver arm and into a hole at the opposite side of the fuse link. As a result of the connection between the arms, turning of the driver arm causes the spring arm to turn, which in turn causes the damper blades to open or close.

The new mechanism also has a guide to increase the reliability in reconnecting the driver arm to the pin arm after the primary ling separates. The preferred guide is an elongated tongue having a U-shaped cross-section that forms a channel and it is mounted between the spring arm and driver arm. The tongue has a closed end and the spring arm pin passes through a hole at the closed end, connecting the spring arm to the tongue. The driver arm pin rides in a longitudinal tongue slot, connecting the driver arm to the tongue. A secondary link that separates at a higher temperature (180° C.) is also mounted on the driver arm pin and its end opposite the driver arm pin rests on the outside of the tongue's closed end.

A shaft spring is also mounted on the shaft and coupled to the spring arm, providing a bias to close the damper blades. When the temperature exceeds the primary link's separation temperature (74° C.), it separates and disconnects the driver arm from the spring arm. The bias from the closing spring causes the spring arm to close the damper blades. This also causes the driver arm pin to slide down the tongue slot to the end of the tongue opposite its closed end, dragging the secondary link with it.

By cycling the motor to the closed position, the secondary link will be pushed back down the tongue channel by the driver arm pin, towards the tongues closed end. When it reaches the end of the tongue it engages the spring arm pin, reattaching the driver arm to the spring arm. Rotation from the driver arm again causes rotation of the spring arm such that the blades can be opened or closed through rotation of the shaft by the motor. When the ambient temperature exceeds the secondary link's separation temperature (180° C.), it separates and the bias of the closing spring will again cause the spring arm to permanently close the damper blades.

The new mechanism is robust, reliable and less complex than the prior art. The tongue provides a channel that guides the secondary link to engage the primary pin, reliably reattaching the driver and spring arm after the primary link separates. This allows selected dampers to be reliably reopened after the primary link separates and used for the control of smoke spread until the second link separates.

These and other further features and advantages of the invention will be apparent to those skilled in the art from the following detailed description, taken together with the accompanying drawings, in which:

BRIEF DESCRIPTION OF THE DRAWINGS

FIGS. 10a–10e are sectional views of the tongue, driver arm pin, secondary link and spring arm pin in the normal operating position, after the primary link separates, and thereafter engages the secondary link.

DETAILED DESCRIPTION OF THE INVENTION

Figure 1:
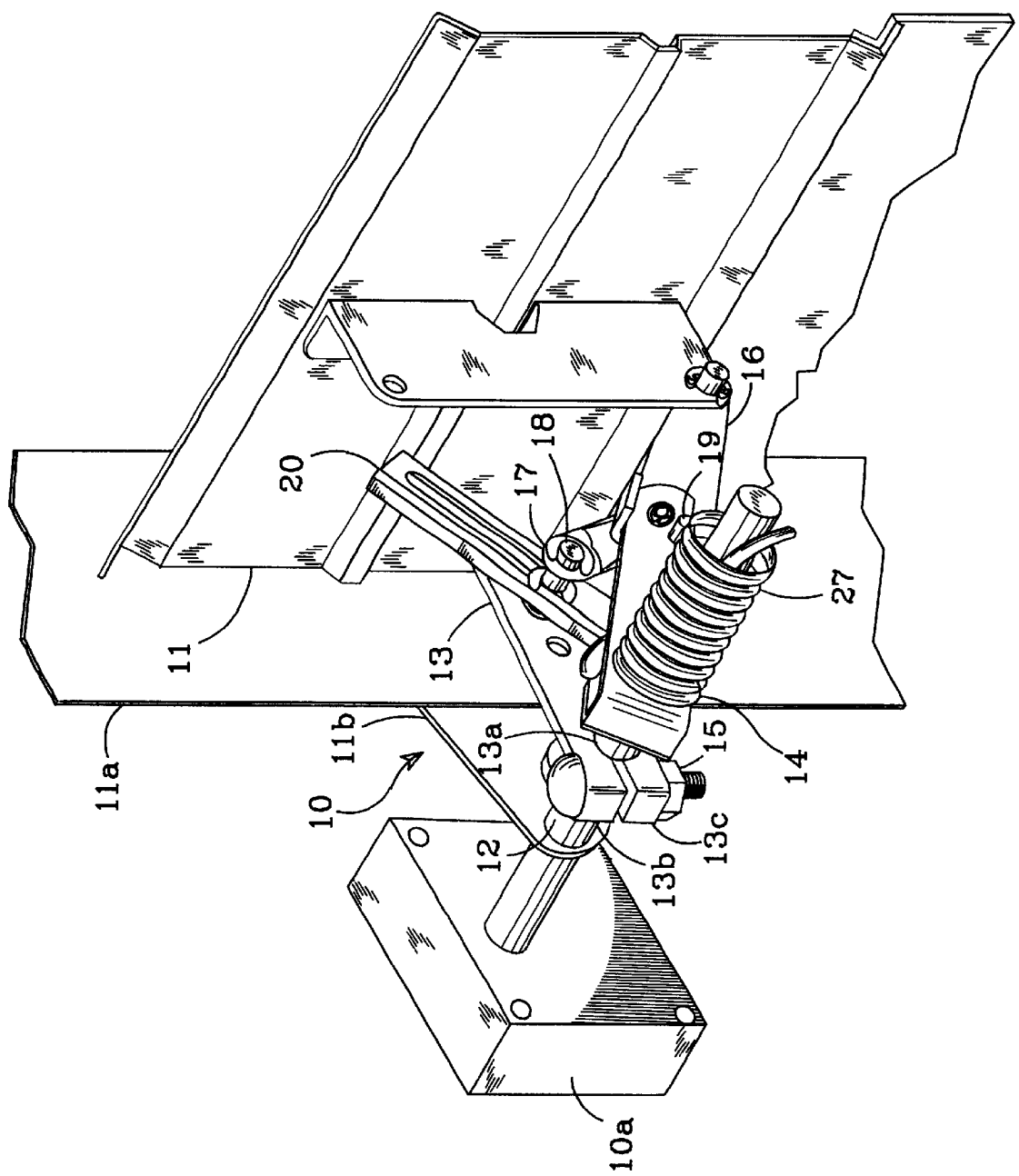
FIG. 1 is a perspective view of the new damper mechanism attached to a damper blade.
Figure 2:
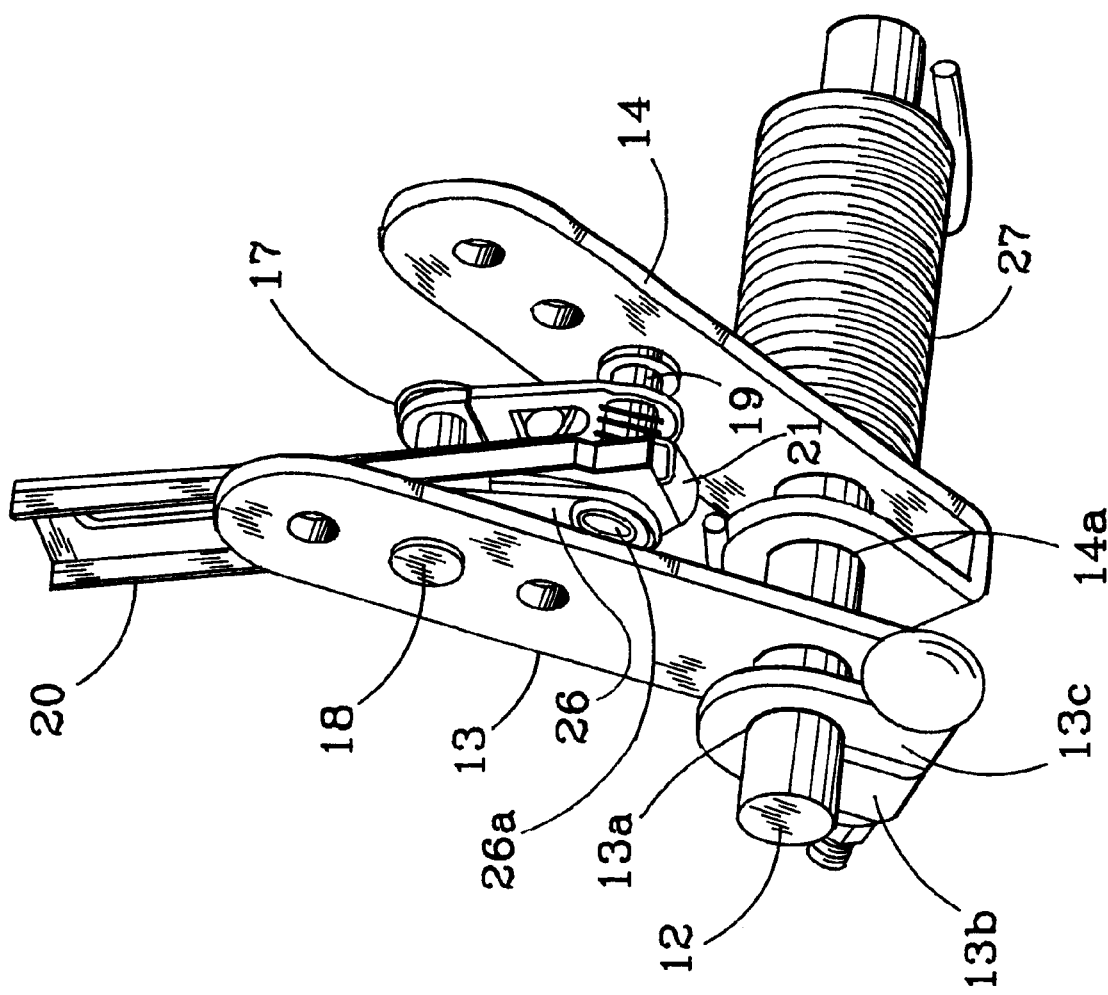
FIG. 2 is a perspective view of the new mechanism from its left side.
Figure 3:
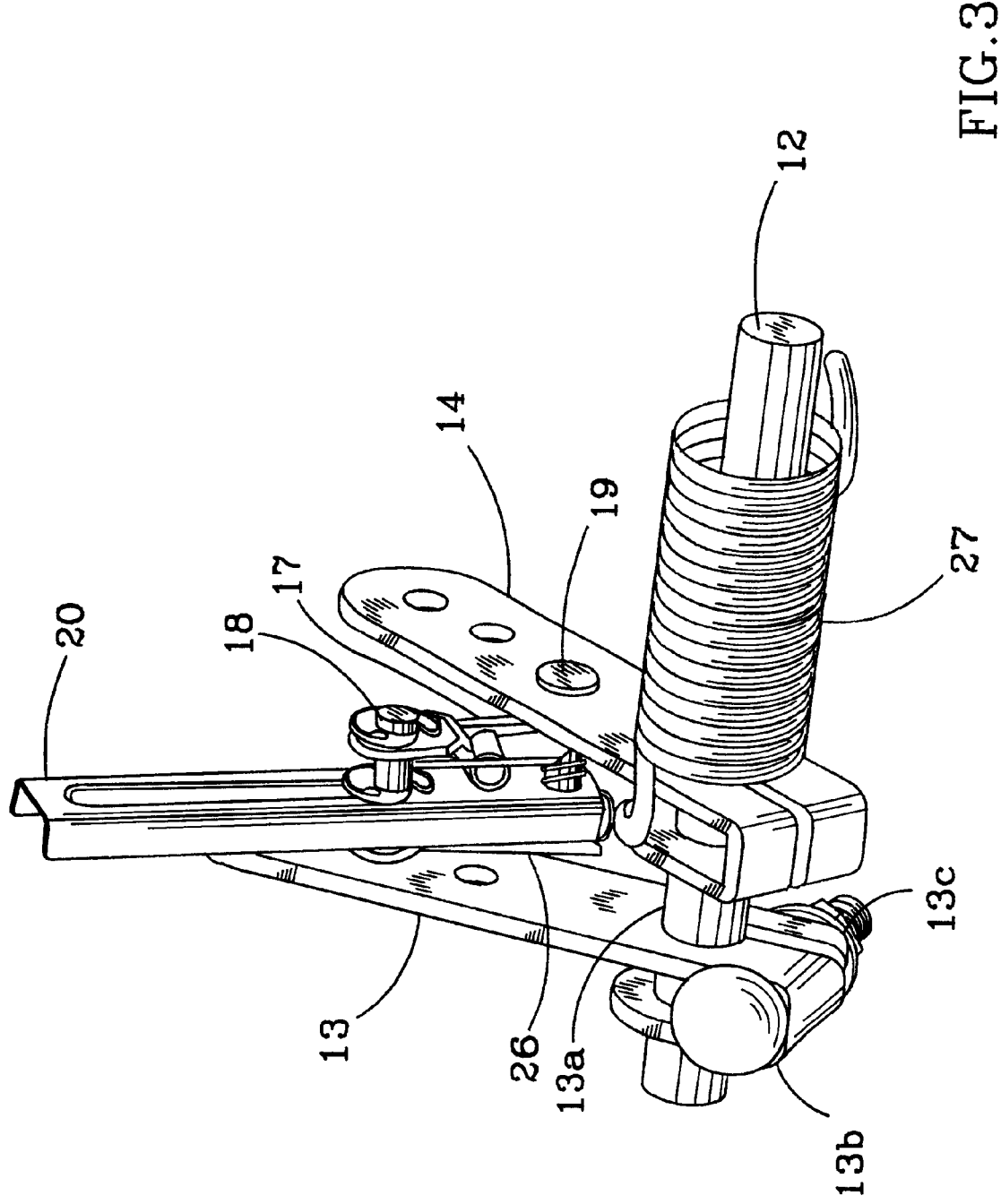
FIG. 3 is a perspective view of the new mechanism from its right side.
Figure 4:
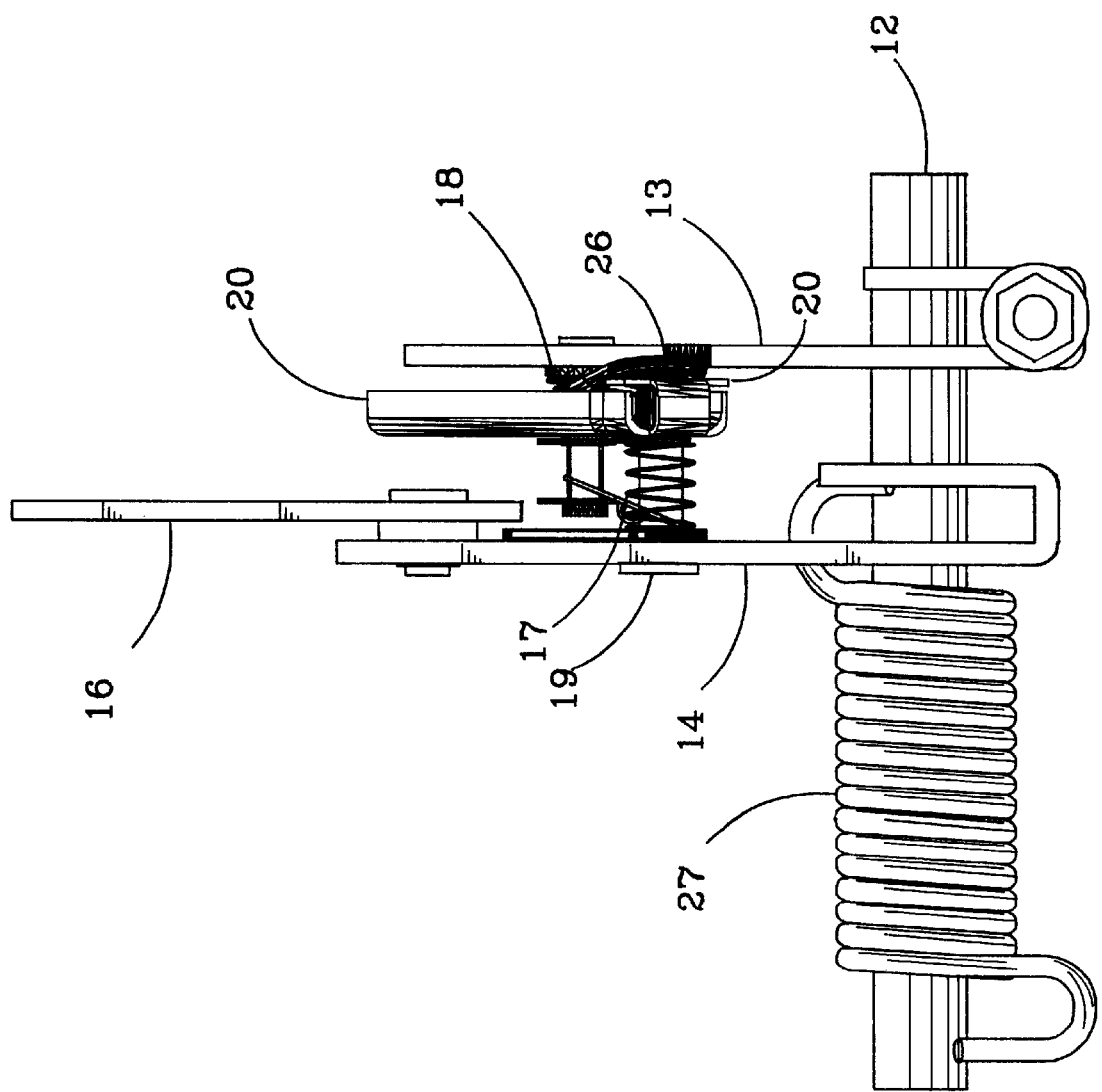
FIG. 4 is the front elevation view of the new mechanism.
Figure 5:
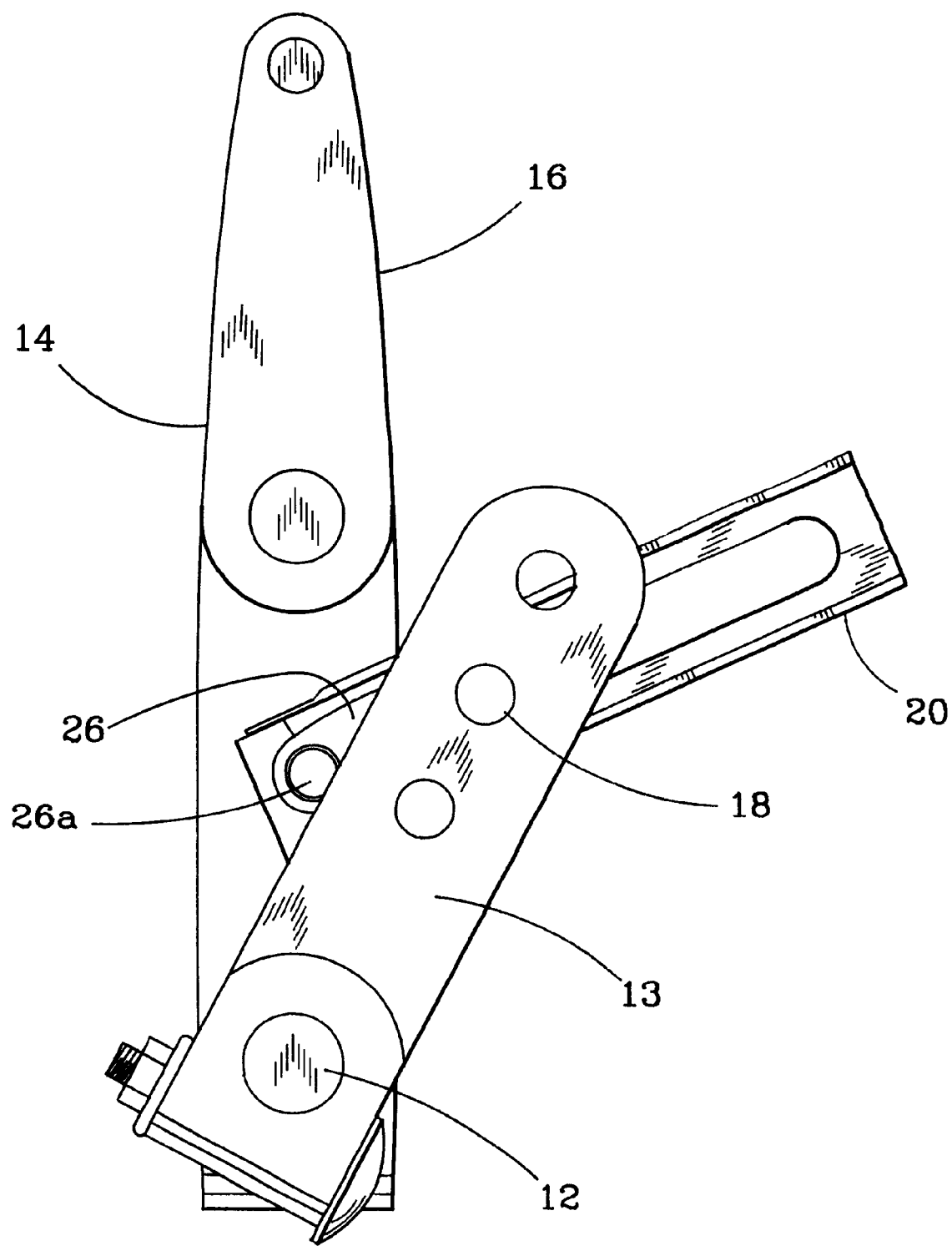
FIG. 5 is a side elevation view of the new mechanism.

Referring to FIGS. 1–5 in conjunction, they show a dual temperature fire damper releasing mechanism constructed in accordance with the invention in its operating below the primary link's separation temperature. The mechanism 10 is mounted adjacent to a damper blade 11 within a damper, to open and close the blade. Each damper has numerous blades 11 that are interlinked and mounted in a damper frame 11a.

By opening or closing a single blade 11, all of the blades in the damper are opened or closed in unison. Thus, a single mechanism 10 can be used control a damper.

The size and shape of the components that comprise the mechanism 10 can vary. The mechanism 10 shown in FIGS. 1–5 comprises a metal shaft 12 that is ½ inch in diameter and has different lengths depending on the size of the damper. It is connected to the damper frame by a shaft bracket 11b and is connected to and rotated about its longitudinal axis by a motor or pneumatic actuator 10a. A metal driver arm 13 and spring arm 14 are mounted the shaft 12, perpendicular to the shaft's longitudinal axis. Both arms have a similar shape and are about 4 inches long and have a width of about 1 at their base. Both are folded over at their base to provide a hook shaped longitudinal cross-section. Both have a hole 13a and 14a passing through their respective hook end, each hole being the appropriate size to mate with the shaft 12 for mounting the arms on the shaft 12.

The driver arm 13 is fixed on the shaft 12 by nut and bolt assembly 15 that compresses the shaft 12 between two flanges 13b and 13c at the base of the driver arm 13. When the shaft 12 rotates, the driver arm 13 turns in an arc with the rotation of the shaft.

The spring arm 14 is not fixed to the shaft 12 but can turn freely about it. The spring arm 14 is also attached to a damper blade 11 by a knee coupling 16. To open the blade 11 the spring arm 14 is rotated counter clockwise and to close the blade, the spring arm 14 is rotated clockwise. A shaft spring 27 is mounted on shaft 12 adjacent to and connected to the spring arm 14, biasing the spring arm 14 to close the blade 11.

At ambient temperatures below a first predetermined temperature (74° C.), the driver arm 13 is connected to the spring arm 14 by a primary link 17. A driver arm pin 18 passes through a hole on the driver arm 13 and through an aligned hole in the primary link 17. A spring arm pin 19 passes through a hole on the spring arm 14 and through an aligned hole in the primary link 17 that is opposite the driver arm pin 19. Accordingly, when the motor rotates the shaft 12, the fixed driver arm 13 turns and the spring arm 14 turns with it. This causes the damper blade 11 to open or close under control of the motor depending on the direction of rotation. The arms 13 and 14 are not aligned on the shaft but have a rotational offset from the primary link 17.

The primary link 17 separates when the ambient temperature reaches the predetermined first level. Many commercially available fusible links can be used, but the preferred link is provided by Star Sprinkler Corporation, part number 1882-02. The Star Fusible Link consists of a two piece stainless steel strut, locked together by a fusible alloy sealed in the center of a bronze tube by a stainless steel ball. When the alloy melts, the fusible assembly compresses, allowing it to eject from between the two piece strut. The strut assembly separates by the tension the shaft spring 27 on the spring arm 14. The separation of the primary link 17 disconnects the driver arm 13 from the spring arm 14 and the blade 11 will be closed by the bias of the shaft spring 27 on the spring arm 14.

Figure 8:
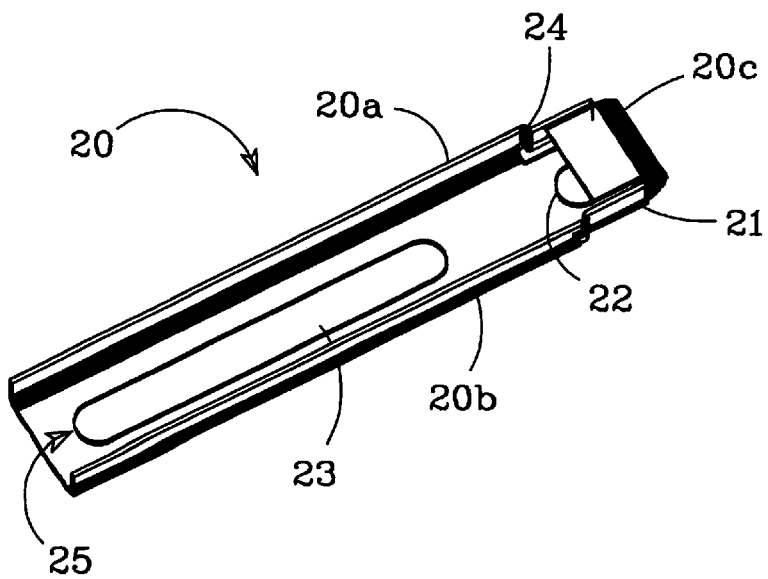
FIG. 8 is a perspective view of the tongue.

The new mechanism also has a guide that allows the driver arm 13 to reliably reconnect to the spring arm 14, a described below. One embodiment of the guide is an elongated tongue 20 mounted between and connected to the driver arm 13 and spring arm 14. FIG. 8 shows a perspective view of the tongue 20 that has a U-shaped cross-section forming a longitudinal channel 25. The tongue 20 is made of conventional sheet metal, is wide enough to allow the secondary link 26 to rest within its channel 25, and is long enough to allow for the full range of motion as the driver arm 14 is cycled after separation of the primary link 17. In the embodiment shown, the tongue 20 is approximately 3.5 inches long, 0.6 inches wide and has a closed hollow end 21. Its U-shaped cross-section is formed by folding its longitudinal sides 20a and 20b at right angles, such that the sides of are approximately 0.25 inches high. Its closed end 21 is formed by folding a flap of sheet metal 20c back over the tongue approximately 0.3 inches, with the tongue's U-shape cross-section and the flap 20c defining the tongue's closed end 21.

The tongue has a slight bottleneck 24 such that its closed end 21 narrows slightly to guide the secondary link 26 to engage the spring arm pin 19, as described below. In the embodiment shown, the closed end is about 0.55 inches wide. The closed end 21 has a hole 22 on the surface opposite the flap 20c. The tongue 20 also has a slot 23 starting near its open end and running down its longitudinal centerline for approximately ¾ of its length. In the embodiment shown, the slot starts approximately 0.2 inches from the tongue's open end and running approximately 2.2 inches toward its closed end.

Referring again to FIGS. 1–5, after the spring arm pin 19 passes through the spring arm 13 and the hole in the primary linkage 17, it passes through the tongue hole 22, attaching the spring arm 14 to the tongue 20. After the driver arm pin 18 passes through the driver arm, it passes through the longitudinal tongue slot 23 and then into the primary link 17. The driver arm pin 18 in not fixed in one location in the slot 23, but slides within it.

A secondary link 26 is also mounted on the driver arm pin 18, between the tongue 20 and the driver arm 13. At a second predetermined temperature (180° C.) that is higher than the first predetermined temperature, the secondary link separates. Many commercially available links can be used, with the preferred link being a Model A or B fusible link provided by Elsie Manufacturing Company. The end of the secondary link 26 opposite the driver pin 18 rests against the outside surface of the tongue's closed end 21. The same end of the secondary link 26 has a hole 26a that mates with the spring arm pin 19 to reopen the blade 11 after the primary link 17 has separated.

Figure 6:
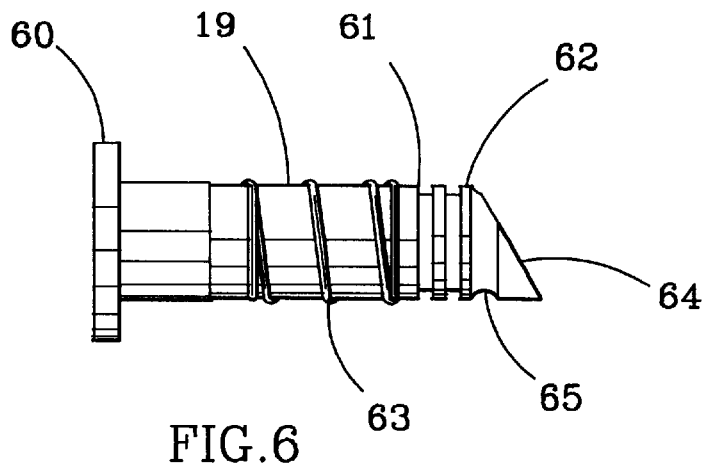
FIG. 6 is a top and side elevation view of the spring arm pin.

The spring arm pin 19 is shown in FIG. 6. When installed, the head 60 rests against the surface of the spring arm 14. The pin 19 has two axial slots 61 and 62 for holding retaining washers, such that the tongue 20 is held between the washers. A bias spring 63 is mounted on the pin 19 between the tongue 20 and primary link 17, spreading the two and biasing the primary link 17 against the inside surface of the spring arm 14. The end of the spring arm pin 19 passes into the tongues closed end 21 and it has an angled end 64 to engage the secondary link 26. It also has a notch 65 that holds the secondary link on the spring arm pin once the two are engaged.

Figure 7:
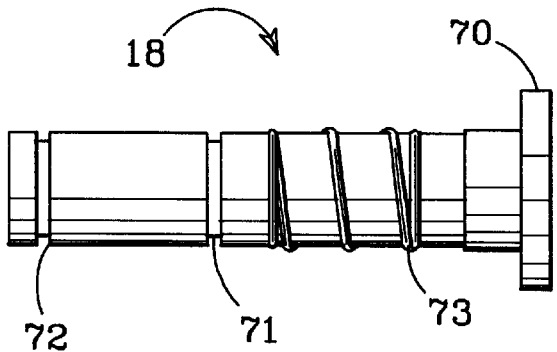
FIG. 7 is a top and side elevation view of the driver arm pin.

FIG. 7 shows the driver arm pin 18. When installed its head 70 rests against the driver arm 13. The pin 18 has two slots 71 and 72 for retaining washers, and also has a bias spring 73. The primary link 17 is held on the pin 18 by a retaining washer mounted in slot 72. The tongue 20 is held between the retaining washer in slot 71 and the spring 73 with the secondary link between the spring 73 and the tongue 20. The bias of spring 73 holds the end of the secondary link against the tongues closed end. The spring 73 also separates the driver arm 14 from the secondary link 26 and the tongue 20, and biases the tongue against the retaining washer in slot 71.

Figure 9:
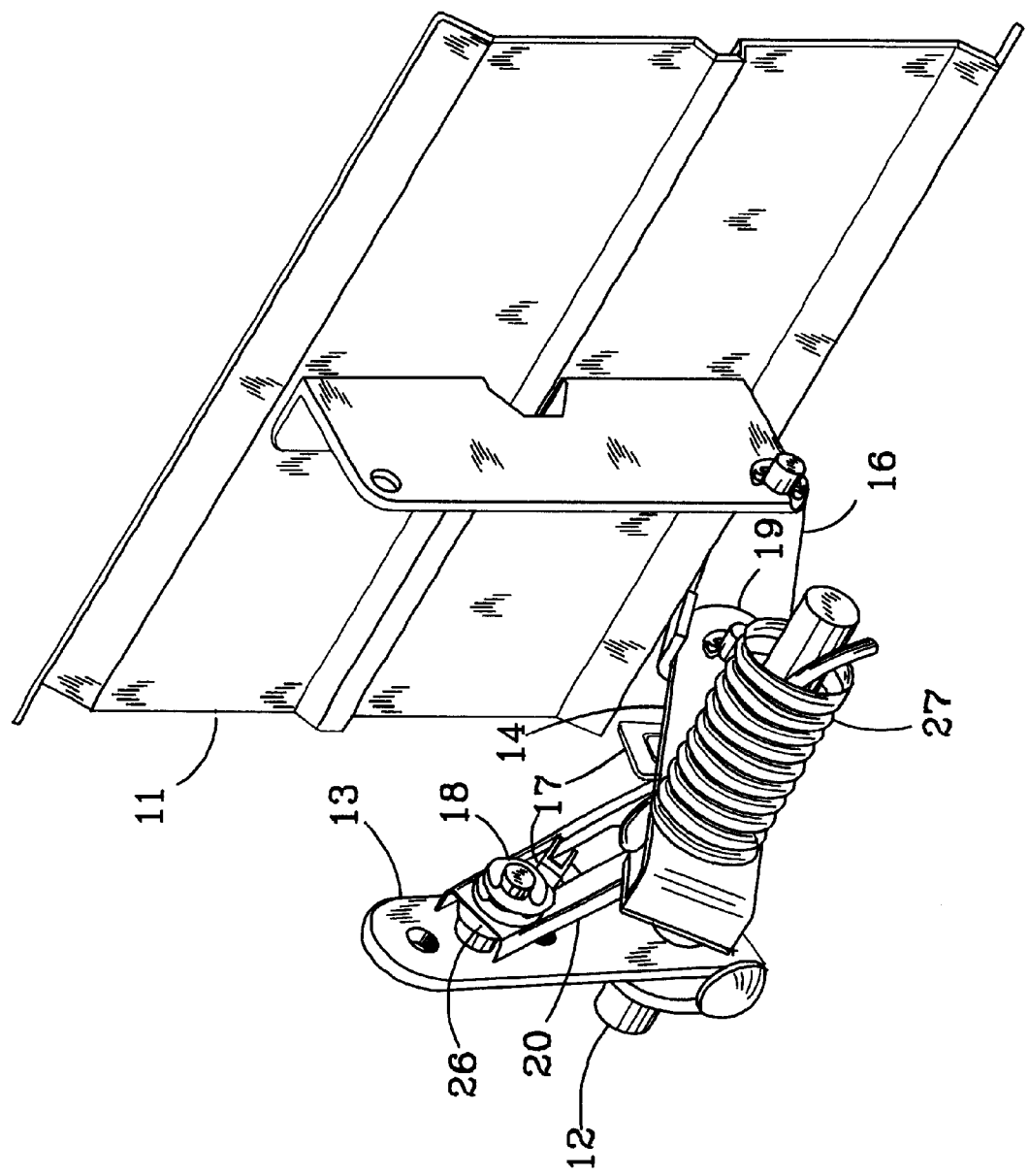
FIG. 9 is a perspective view of the new mechanism attached to a damper blade after the primary link has separated.

If the mechanism 10 is in the damper blade open state when the primary link 17 separates, the driver arm 13 and spring arm 14 will be rotationally separated as the spring arm is turned to the damper blade closed position by the shaft spring 27. As this occurs, the tongue 20 is pulled along with the spring arm 14 and the tongue slot 23 slides on the driver arm pin 18. The end of the secondary link 26 is also pulled down the tongue's channel 25 with the pin 18. This allows the end of the secondary link 26 resting on the tongue's closed end 21 to fall within the channel 25. When the blade is closed, the driver arm pin 18 will be at the end of the slot 23 opposite the tongue's closed end 21, with the link 26 fully within the tongue channel. FIG. 9 shows the state of the mechanism 10 after the primary link 17 separation, when the mechanism 10 was blade open position prior to separation.

If the mechanism 10 was in blade closed position when the primary link 17 separated, the spring arm 13 would already be in the closed location on the shaft 12. The driver arm 13 and spring arm 14 would be disconnected, but the shaft spring 27 would not rotate spring arm 13 away from the driver arm 13. As a result, there would be no separation between the driver arm and spring arm, and the tongue slot 23 would not slide down the driver arm pin 18. The end of the secondary link 26 would remain on the tongue's closed end 21.

To reopen the blade 11, the mechanism 10 must be brought to the state shown in FIG. 9. The motor rotates the shaft to the blade open position, turning the driver arm 13. Because the two arms are now disconnected, the turning of the driver arm 13 will not turn the spring arm 14. The driver arm pin 18 will slide within the tongue slot 23 until it reaches the end of the slot opposite the tongue's closed end 21. As this occurs, the secondary link 26 will fall from the outside of the tongue's closed end and will be pulled within the tongue's channel 25 by the driver arm pin 18.

From the disconnected and separated state of the mechanism 10 shown in FIG. 9, the driver arm 13 and spring arm 14 must be reconnected by the secondary link 26. The arms must be repositioned such that the link's open hole 26a engages the angled end 64 of the spring arm pin 19 in the tongues closed end 21.

FIGS. 10a through 10e show sectional views of the tongue 20, secondary linkage 26, driver pin 18 and spring arm pin 19 in different operational states. In FIG. 10a, the driver arm pin 18 and spring arm pin 19 have not been separated and end of the secondary link 26 having the hole 26a, is resting on the tongues closed end 21 as described above. In FIG. 10b, the primary link has separated and the pins 18 and 19 have separated as shown in FIG. 9. The secondary link is pulled within the tongue's channel 25 as the pins separate. To reattach the driver arm 13 to the spring arm 14, the motor is cycled to the closed position and the secondary link 26 is pushed by the driver arm pin 18 toward the spring arm pin 19. Referring to FIGs. 10c and 10d, when the secondary link 26 reaches the end of the spring arm pin 19, it rides up the end's angled surface 64. Referring to FIG. 10e, when the driver arm reaches the closed position the link hole 26a mates with the pin 19, and the link falls back against the bottom surface of the tongue's channel 25 with the pin 19 in the hole 26a. The notch 65 in the pin 19 holds the secondary linkage on the pin 19.

The driver arm 13 is now reattached to the spring arm 14 by the secondary link 26. To reopen the damper blade 11, the motor rotates the shaft 12 and moves the driver arm 13 to the open position. This movement will be translated to the spring arm 14 through the secondary link 12, opening the blade 11. The damper can again be opened and closed under control of the motor.

At the second predetermined temperature (180° C.) the secondary link separates and the driver arm 13 is again separated from the spring arm 14. The bias from the shaft spring 27 turns the spring arm 14 to the closed position, closing the damper blade 11. Once the secondary link is separated, the mechanism 10 cannot reopen blade 11.

Although the present invention has been described in considerable detail with reference to certain preferred configurations, other versions are possible. Therefore, the spirit and scope of the appended claims should not be limited to the preferred variations described above.

We claim:

1. A mechanism for controlling the flow through a duct, comprising:
   a damper that allows air to pass when open and blocks air, flames, and hot gasses when closed;
   a motor that provides power to open or close said damper;
   a primary link that connects said motor to said damper below a predetermined temperature and disconnects said motor from said damper above said predetermined temperature;
   a secondary link that separates at a predetermined higher temperature, said secondary link with one end connected to one of said motor and said damper and a connectable end connectable to the other said motor and said damper to reconnect said motor and said damper after said primary link separates them, and to thereafter disconnect them at said higher temperature; and
   a guide connected between said motor and said damper that directs said secondary link to reconnect said motor and said damper after said primary link separates.

2. The mechanism of claim 1, wherein said guide comprises a tongue having a U-shaped cross-section that forms a longitudinal channel, said secondary link riding in said tongue channel to reconnect said motor and said damper after said primary link separates.

3. The mechanism of claim 2, wherein said tongue further comprises a closed end, said connectable end of said secondary link resting on the outside surface of said closed end, said secondary link falling from said closed end and fully within said channel upon separation of said primary link.

4. The mechanism of claim 1, wherein said damper closes when said primary link separates.

5. The mechanism of claim 1, wherein said damper closes when said secondary link separates.

6. A dual temperature closing mechanism for opening and closing blades of a damper under power from a motor or actuator, comprising:
   a shaft having a longitudinal axis and rotatable by said motor or actuator about its longitudinal axis;
   a driver arm and a spring arm mounted on said shaft, one of said driver and spring arms connectable to the blades of a damper;
   a primary link that connects said driver arm and spring arm below a predetermined temperature disconnects said driver and spring arms above said predetermined temperature;
   a secondary link that separates at a predetermined higher temperature, said secondary link having one end connected to one of said driver and spring arms and an unconnected end connectable to the other of said driver and spring arm to reconnect said driver and spring arms after said primary link separates them, and to thereafter disconnect them at said higher temperature; and
   a guide attached to said driver and spring arm that directs said secondary link to one of said driver and spring arm not connected to said secondary link, to reconnect said driver and spring arms after said primary link separates.

7. The mechanism of claim 6, further comprising a shaft spring mounted on said shaft and connected to said spring arm to bias it to a rotational position on said shaft to close the blades of the damper when said primary link separates.

8. The mechanism of claim 6, wherein said guide comprises a tongue having a U-shaped cross-section that forms a longitudinal channel, one of said driver and spring arm slideably connected to said tongue and the other of said driver and spring arm connected to said channel, said secondary link riding in said channel and directed to one of said driver and spring arm not connected to said secondary link, to reconnect said arms after said primary link separates.

9. The mechanism of claim 6, wherein said primary link further comprises holes at its opposing ends, said driver arm connected to one primary link hole and said spring arm connected to the other said primary link hole.

10. The mechanism of claim 8, wherein said tongue further comprises a closed end, said unconnected end of said secondary link resting on the outside surface of said closed end, said secondary link falling from said closed end and fully within said channel upon separation of said primary link.

11. The mechanism of claim 8, further comprising a spring arm pin and a driver arm pin, said spring arm pin passing through said spring arm and tongue, said driver arm pin passing through said driver arm, a hole in said secondary link and said tongue.

12. The mechanism of claim 9, wherein said secondary link is connected to said driver arm before separation of said primary link, said spring arm pin having an angled end, said secondary link directed to said angled end within said channel and mating with said angled end to reconnect said driver and spring arms after separation of said primary link.

13. A dual temperature closing mechanism for opening and closing blades of a damper under power from a motor or actuator, comprising:
   a shaft having a longitudinal axis and rotatable by said motor or actuator about its longitudinal axis;
   a driver arm mounted on said shaft;
   a spring arm mounted on said shaft and able to rotate about said shaft, said spring arm also connectable to the blades of a damper;
   a primary link that connects said driver arm and spring arm below a predetermined temperature and disconnects said driver and spring arms above said predetermined temperature; and
   a secondary link that separates at a predetermined higher temperature, said secondary link having an end connected to one of said driver and spring arms and an unconnected end connectable to the other of said driver and spring arm to reconnect said driver and spring arms after said primary link disconnects them, and to thereafter disconnect them at said higher temperature.

14. The mechanism of claim 13, further comprising a shaft spring mounted on said shaft and connected to said spring arm to bias it to close the damper when said primary link separates.

15. The mechanism of claim 13, further comprising a guide attached to said driver and spring arm, directing said secondary link to one of said driver and spring arm not connected to said secondary link, to reconnect said driver and spring arms after said primary link separates.

16. The mechanism of claim 15, wherein said guide comprises a tongue having a U-shaped cross-section that forms a longitudinal channel, said secondary link riding in said tongue channel and directed to one of said driver and spring arm not connected to said secondary link, to reconnect said driver and spring arms after said primary link separate.

17. The mechanism of claim 13, wherein said primary link further comprises holes at its opposing ends, said driver and spring arms connected to a respective said primary link hole.

18. The mechanism of claim 16, wherein said tongue further comprises a closed end, said unconnected end of said secondary link resting on the outside surface of said closed end, said secondary link falling from said closed end and fully within said channel upon separation of said primary link.

19. The mechanism of claim 16, further comprising a spring arm pin and a driver arm pin, said spring arm pin passing through said spring arm and tongue, said driver arm pin passing through said driver arm, a hole in said secondary link and said tongue.

20. The mechanism of claim 17, wherein said secondary link is connected to said driver arm before separation of said primary link, said spring arm pin having an angled end, said secondary link directed to said angled end within said channel and mating with said angled end to reconnect said driver and spring arms after separation of said primary link.

21. A damper that automatically closes at a predetermined temperature, can be reopened, and then automatically closes at a predetermined higher temperature, comprising:

a damper frame;

at least one damper blade mounted in said frame that allows air to pass when open and blocks airflow, flames and hot gasses when closed, a motor to provide rotational force to open and close said at least one damper blade;

a dual temperature damper closing mechanism connected to said motor and to one of said at least one damper blade, said mechanism comprising:

a shaft having a longitudinal axis and rotatable by said motor or actuator about its longitudinal axis;

a driver arm and a spring arm mounted on said shaft, one of said driver and spring arms connectable to the at least one damper blade of a damper;

a primary link that connects said driver arm and spring arm below a predetermined temperature and disconnects said driver and spring arms above said predetermined temperature;

a secondary link that separates at a predetermined higher temperature, said secondary link having an end connected to one of said driver and spring arms and an unconnected end connectable to the other of said driver and spring arm to reconnect said driver and spring arms after said primary link disconnects them, and to thereafter disconnect them at said higher temperature; and a guide attached to said driver and spring arm directing said secondary link to the unconnected one of said driver and spring arm, to reconnect said driver and spring arms after said primary link separates.

22. The damper of claim 21, wherein said guide comprises a tongue having a U-shaped cross-section that forms a longitudinal channel, said secondary link riding in said channel and directed to one of said driver and spring arm not connected to said secondary link, to reconnect said driver and spring arms after said primary link separate.

23. The mechanism of claim 22, wherein said tongue further comprises a closed end, said unconnected end of said secondary link resting on the outside surface of said closed end, said secondary link falling from said closed end and fully within said channel upon separation of said primary link.

24. The mechanism of claim 22, wherein said secondary link is connected to said driver arm before separation of said primary link, said secondary link pulled within said channel after separation of said primary link, and directed to said spring arm by said driver arm to reconnect said driver and spring arms after separation of said primary link.

* * * * *